Patented May 3, 1932

1,856,215

UNITED STATES PATENT OFFICE

RICHARD HERZ, OF FRANKFORT-ON-THE-MAIN, AND WERNER ZERWECK, OF FRANK-FORT-ON-THE-MAIN-FECHENHEIM, GERMANY, ASSIGNORS TO GENERAL ANILINE WORKS, INCORPORATED, OF NEW YORK, N. Y., A CORPORATION OF DELAWARE

PROCESS OF MAKING VAT DYESTUFFS OF THE ANTHANTHRONE SERIES

No Drawing. Application filed December 4, 1929, Serial No. 411,674, and in Germany December 10, 1928.

Our present invention relates to a process which comprises halogenating anthanthrone in an aqueous suspension.

It is surprising that the halogenation of anthanthrone can be performed in such a simple manner and under such mild conditions, since it is generally known that in anthanthrone the hydrogen atoms can only difficultly be substituted.

Throughout this specification and the claims "halogenating" means treating with chlorine or bromine as well as with other chlorinating or brominating agents.

Our new reaction may be carried out in the presence of a carrier selected from the group consisting of I, Fe $Cl_3$ and I $Cl_3$.

The products obtainable by this process correspond generally as to their tinctorial and chemical behaviour to those disclosed in our co-pending U. S. application Serial No. 145,697, filed November 1, 1926.

In order to further illustrate our invention, the following examples are given, the parts being by weight and all temperatures in centigrade degrees. But we wish it to be understood that we are not limited to the particular conditions nor specific products mentioned therein.

Example 1

150 parts of an aqueous paste containing 10% of anthanthrone are mixed with 80 parts of bromine; 0.2 parts of iodine may be added. The mass is slowly warmed to about 60–65° and maintained at this temperature for some time. Then it is diluted with water and freed from the excess of bromine, for instance, by treating it with bisulfite. The residue is filtered off, washed and dried. The brominated anthanthrone corresponds as to its properties to the dyestuff prepared according to Example 10 of U. S. application Serial No. 145,697.

The product may be purified by converting it into the difficultly soluble sulfate according to our U. S. application Serial No. 298,866, filed August 10, 1928, or by recrystallizing it from solvents of a high boiling point, such as nitrobenzene.

Example 2

150 parts of an aqueous paste containing 10% of anthanthrone are mixed with 80 parts of bromine. The mass is slowly warmed to about 60–65°. At this temperature 220 parts of a caustic soda solution of 17.5% strength are introduced drop by drop. Then the mass is worked up as described in Example 1. The dyestuff thus obtained is substantially identical to that of Example 1.

In an analogous manner a chlorinated anthanthrone is produced by acting with chlorine on an aqueous suspension of anthanthrone.

Example 3

A solution of 1 part of anthanthrone in 20 parts of concentrated sulfuric acid is introduced into 200 parts of water. Thereby anthanthrone precipitates in a finely divided form. To this suspension 20 parts of common salt are added. Then the mass is warmed to 60°. At this temperature an aqueous solution of 5 parts of sodium hypochlorite is allowed to run in drop by drop in the course of some hours. The reaction mass is maintained for some time at 60–65°, then the chlorinated anthanthrone is filtered off, washed till free from acid and dried. It may be purified as described in Example 1. It dyes from a violet vat orange shades.

We claim:

1. The process which comprises halogenating anthanthrone in an aqueous suspension.

2. The process which comprises halogenating anthanthrone in an aqueous suspension in the presence of a carrier selected from the group consisting of I, Fe $Cl_3$ and I $Cl_3$.

3. The process which comprises reacting with bromine on an aqueous suspension of anthanthrone in the presence of iodine as a carrier and at a temperature of about 60 to 65° C.

4. The process which comprises reacting with bromine on an aqueous suspension of anthanthrone in the presence of caustic soda and at a temperature of about 60 to 65° C.

5. The process which comprises reacting with sodium hypochlorite on an aqueous suspension of anthanthrone in the presence of dilute sulfuric acid and common salt, at a temperature of about 60° C.

In testimony whereof, we affix our signatures.

RICHARD HERZ.
WERNER ZERWECK.